(12) United States Patent
Spronken

(10) Patent No.: US 9,851,049 B1
(45) Date of Patent: Dec. 26, 2017

(54) CRANE TIE ARM ADJUSTMENT

(71) Applicant: John Rene Spronken, Calgary (CA)

(72) Inventor: John Rene Spronken, Calgary (CA)

( * ) Notice: Subject to any disclaimer, the term of this patent is extended or adjusted under 35 U.S.C. 154(b) by 0 days.

(21) Appl. No.: 15/254,010

(22) Filed: Sep. 1, 2016

(30) Foreign Application Priority Data

Aug. 29, 2016 (CA) ..................................... 2940559

(51) Int. Cl.
*F16M 13/02* (2006.01)

(52) U.S. Cl.
CPC ................................. *F16M 13/022* (2013.01)

(58) Field of Classification Search
CPC .................................................... F16M 13/022
See application file for complete search history.

(56) References Cited

U.S. PATENT DOCUMENTS

| | | |
|---|---|---|
| 3,540,762 A | 11/1970 | Dunlap |
| 3,837,753 A | 9/1974 | Weiste et al. |
| 3,895,829 A | 7/1975 | Manson, Jr. |
| 3,922,009 A | 11/1975 | Giebeler |
| 4,185,856 A | 1/1980 | McCaskill |
| 4,294,332 A | 10/1981 | Ready |
| 4,949,809 A | 8/1990 | Levi et al. |
| 5,358,524 A | 10/1994 | Richelsoph |
| 5,403,043 A | 4/1995 | Smet |
| 6,030,386 A | 2/2000 | Taylor et al. |
| 6,283,511 B1 | 9/2001 | Kamp |
| 6,764,110 B2 | 7/2004 | Russell |
| 6,860,525 B2 | 3/2005 | Parks |

(Continued)

FOREIGN PATENT DOCUMENTS

| | | |
|---|---|---|
| CA | 1127964 A1 | 7/1982 |
| CN | 202226578 U | 5/2012 |

(Continued)

OTHER PUBLICATIONS

File: De Bange 90 mm field cannon and breech system before 1923.jpg, source: Encyclopedie Larousee Illustree. Originally uploaded to EN Wikipeclia as en: File: De Bange 90 mm field cannon and breech system before 1923.jpg by User: PHG Dec. 2, 2008, author: unknown.

(Continued)

*Primary Examiner* — Moshe Wilensky
(74) *Attorney, Agent, or Firm* — Reichel Stohry LLP; Mark C. Reichel; Natalie J. Dean

(57) ABSTRACT

Provided herein is a crane tie arm assembly for connecting a crane to a structure. The assembly comprises: (i) a first arm comprising a cylindrical female end portion having a plurality of internal, elongate protuberances parallel to one another and arranged in axially extending columns; and (ii) a second arm comprising a cylindrical male end portion having a plurality of spaced external, elongate protuberances, which protuberances are arranged in axially extending columns on the external surface thereof for mating engagement with channels formed between protuberances of the female end portion. The assembly can be coupled and locked in place by sliding the male end portion axially into the female end portion and then rotating either end portion circumferentially to sufficiently to engage surfaces of the protuberances with the channels. A stop element is disposed on the female end portion or the male end portion for preventing over-elongation of the assembly.

20 Claims, 5 Drawing Sheets

(56) References Cited

U.S. PATENT DOCUMENTS

| | | |
|---|---|---|
| 6,966,541 B2 | 11/2005 | Dzunda et al. |
| 7,513,537 B2 | 4/2009 | Mosing et al. |
| 7,648,529 B2 | 1/2010 | An et al. |
| 7,874,860 B2 | 1/2011 | Starke et al. |
| 8,057,474 B2 | 11/2011 | Knuchel et al. |
| 8,365,754 B2 | 2/2013 | Riley et al. |
| 8,506,566 B2 | 8/2013 | Karidis |
| 8,574,232 B1 | 11/2013 | Ross et al. |
| 8,945,128 B2 | 2/2015 | Singh et al. |
| 2002/0010465 A1 | 1/2002 | Koo |
| 2007/0236002 A1 | 10/2007 | Knight |
| 2009/0170364 A1 | 7/2009 | Scholler et al. |
| 2010/0260540 A1 | 10/2010 | Church |
| 2013/0207382 A1 | 8/2013 | Robichaux |
| 2014/0276821 A1 | 9/2014 | Murray et al. |
| 2015/0184784 A1 | 7/2015 | Chisholm |
| 2015/0268001 A1 | 9/2015 | Porter et al. |
| 2016/0097210 A1 | 4/2016 | Nielsen et al. |

FOREIGN PATENT DOCUMENTS

| | | |
|---|---|---|
| CN | 203359765 U | 2/2013 |
| CN | 203006798 U | 6/2013 |
| CN | 203006801 U | 6/2013 |
| CN | 102285602 B | 11/2013 |
| CN | 203754288 U | 8/2014 |
| CN | 204162331 U | 2/2015 |
| EP | 2669532 B1 | 11/2015 |
| GB | 1401551 A | 7/1975 |
| JP | 08338024 A | 12/1996 |
| JP | 11141527 A | 5/1999 |
| JP | 2003128385 A | 5/2003 |
| JP | 2006200162 A | 8/2006 |
| JP | 2011246236 A | 12/2011 |
| KR | 1020060118322 A | 11/2006 |
| KR | 100841979 B1 | 6/2008 |
| KR | 1020110013661 A | 2/2011 |
| KR | 101141593 B1 | 4/2012 |
| KR | 101242170 B1 | 3/2013 |
| KR | 101291517 B1 | 8/2013 |
| KR | 1020150000299 A | 1/2015 |
| KR | 200476243 Y1 | 2/2015 |
| TW | M402883 U | 5/2011 |
| WO | WO0109522 A1 | 2/2001 |
| WO | WO2015113032 A9 | 7/2015 |

OTHER PUBLICATIONS

Specialty Connectors (Quik-Jay Connectors), DRIL-QUIP, Apr. 1, 2014, http://www.dril-quip.com/resources/catalogs/13.%20Specialty%20Conn.

Deepwater Subsea Test Tree & Intervention Riser System, DTC International Inc, Jun. 22, 2010, http://www.rpsea.org/media/files/files/42dd1086/EVNT-PR-09121-3500-07_2010_DW_Subsea_Test_Tree_Intervention_Riser-Beebe_06-23-10.pdf.

Lee's Precision Breech Lock Challenger System, Nov. 6, 2007, http://leeprecision.com/breech-lock-challenger-kit.html.

The clever little Merkel RX Helix, Mauserm Blog, Jan. 12, 2014, http://mauserm03blog.blogspot.ca/2014_02_01_archive.html.

Gene Slover's US Navy, US Navy Pages, Oct. 1, 2002, http://www.eugeneleeslover.com/USNAVY/GUN-BARL-CONSTRUCTION-1.html.

Favourite Unpicked Locks, The Amazing King, Nov. 10, 2008, http://www.theamazingking.com/images/locks/mcs3d-shell.JPG.

Taylor Spatial Frame Hardware, http://weborto.net/forum/1162807471/pics/2k6/11/tsf2.pdf.

Camcon—Twist Lock Extending Shelter Pole, Proforce Equipment Inc., 2006, http://www.proforceequiprnent.com/product-details.php?id=496&catid=29.

Pole Series 1 and the Extension Unit, Fanotec, Nodal Ninja, 2012, http://www.nodalninja.com/Manuals/PoleSeries1andExtUnit_QRG.pdf and https://www.youtube.com/watch?v=_G1deMoJuEw.

External twist action telescopic pole clamping system, You tube video, Nov. 11, 2013, video link: https://www.youtube.com/watch?v=KSzlju0PIM4.

Paratech Twistlock Vehicle Stabilizer, Paratech Incorporated, http://www.paratech.com/sites/default/files/paratech_manuals_tvs.pdf.

Hub City Farm Products and Accessories, Q1-Q22, http://www.hubcityinc.com/documents/6q-FarmProductsandAccessories.pdf.

VS—TwistLock Vehicle Stabilizer, You tube video, https://www.youtube.com/watch?v+wFVk7we1ICg.

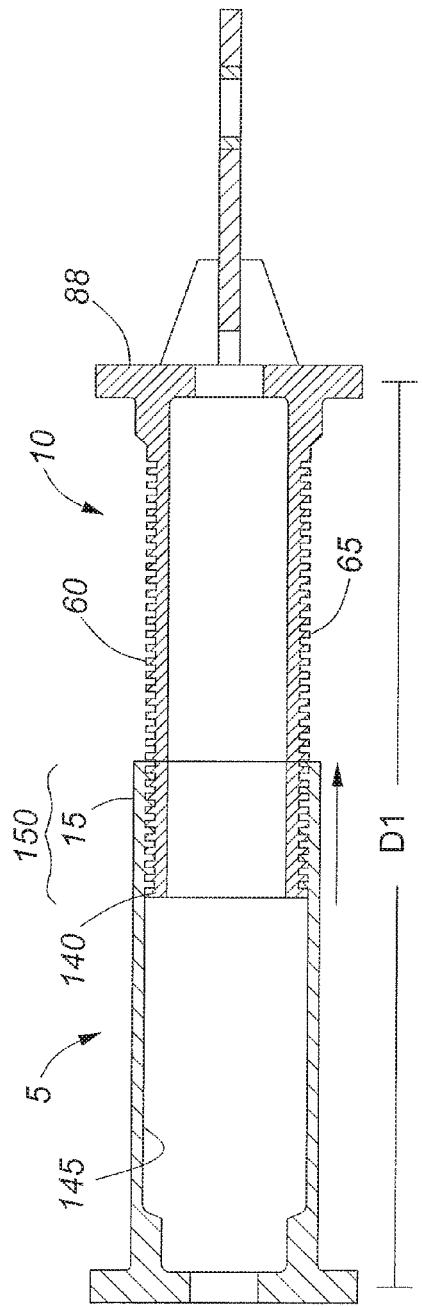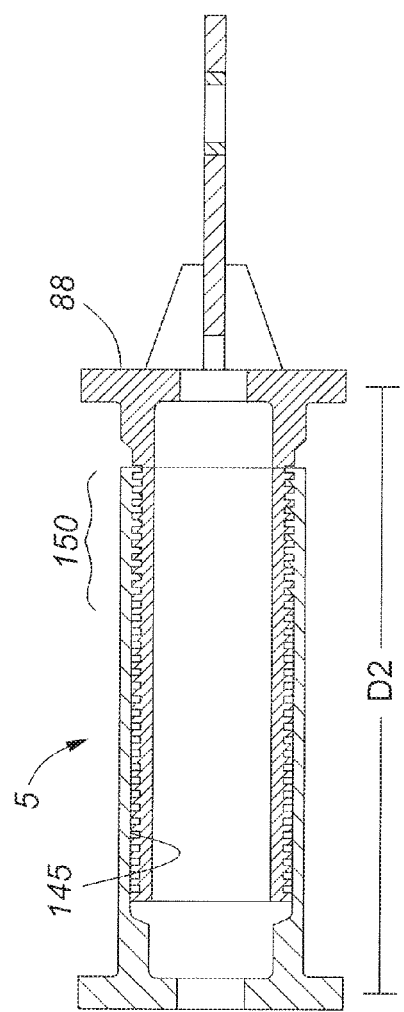

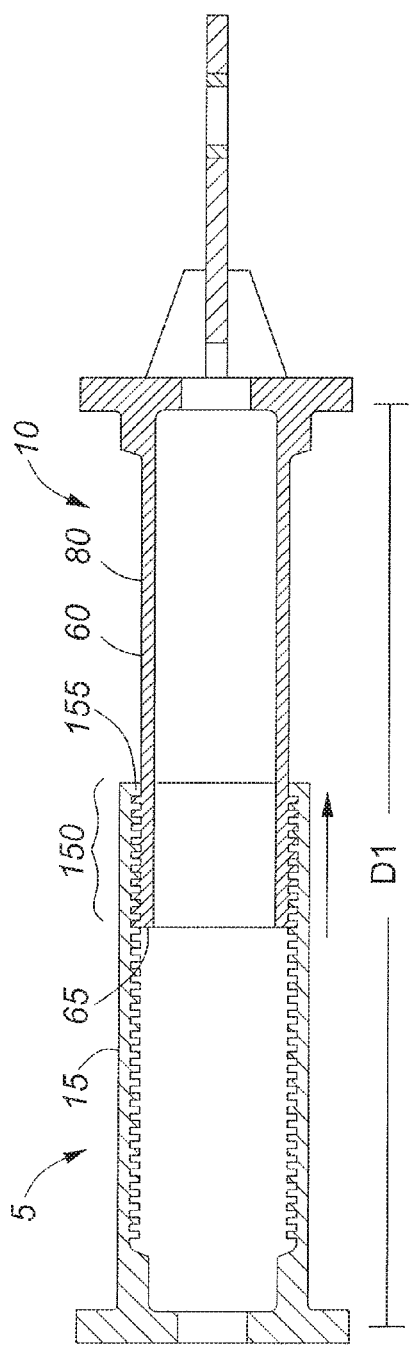
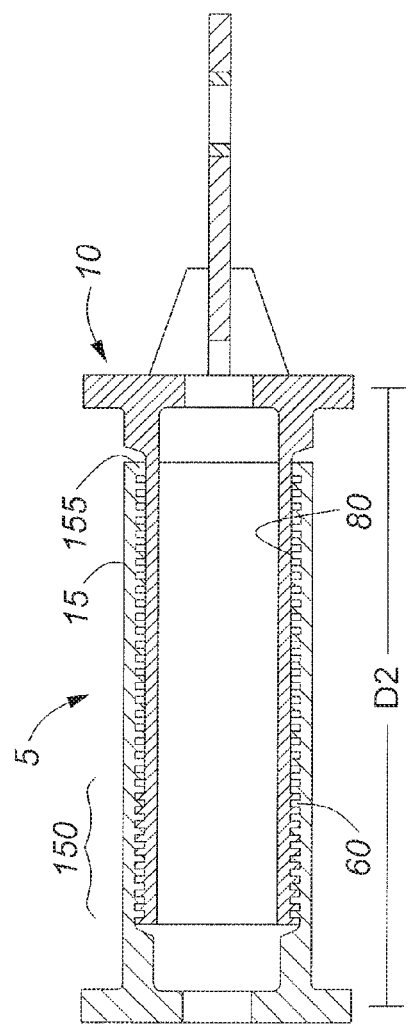

CRANE TIE ARM ADJUSTMENT

TECHNICAL FIELD

The disclosure relates to a tie arm assembly to connect a crane to a structure or to connect two structures.

BACKGROUND

Collapse of a crane can lead to serious injury and even loss of life. To address this safety issue, cranes are often attached to adjacent structures for added stability. One known technique for achieving this is to use a tie arm assembly. Tie back arms in such an assembly attach at one end to the body of the crane, such as a crane collar, and at the other end to the adjacent structure, often via an anchor fixed on the structure.

The spacing between the crane body and the structure to which the crane is attached can vary significantly depending on the structure to which the crane is attached. Traditionally, tie arm assemblies for use in stationary cranes are custom fabricated to the exact length required. However, custom fabrication is not only expensive but time consuming. The length adjustment can also be made using what is effectively a giant turnbuckle or adjustable shore post. A disadvantage of such an attachment is that there is a right-hand screw at one end and a left-hand screw at the other end which must be accessed after adjustment for proper securement of the crane to the structure. The physical height at which these units are installed makes this an expensive operation.

Accordingly, it would be advantageous to provide a crane tie arm assembly for connecting a crane to a structure that is simple in construction, easy to install and adjustable to a desired length, while ensuring structural integrity is maintained sufficiently. The embodiments disclosed herein seek to address the problems in known tie back arms or to provide one or more useful alternatives.

BRIEF SUMMARY

In particular embodiments the invention is directed to:
1. A crane tie arm assembly for connecting a crane to a structure, said assembly comprising:
(i) a first arm comprising:
a cylindrical female end portion having a plurality of internal, elongate protuberances separated by channels defined therebetween, which protuberances are aligned parallel to one another and arranged in axially extending columns and wherein regions defined between said axially extending columns are smooth;
(ii) a second arm comprising:
a cylindrical male end portion having a plurality of spaced external, elongate protuberances, which protuberances are arranged in axially extending columns on the external surface thereof for mating engagement with the channels of said female end portion, and wherein regions defined between said columns of the male end portion are smooth, wherein, the axially extending columns on the first and second arms are dimensioned such that the assembly can be coupled by aligning the protuberances of the male end portion with corresponding smooth regions of the female end portion, sliding the male end portion axially into the female end portion and rotating the male or female end portion sufficiently to engage surfaces of the protuberances with complementary surfaces of the channels, thereby engaging the first and second arms in a locked position; and wherein the first or second arm comprises a region that is axial to the axially extending columns, which region is free of protuberances and channels so that the second arm can be inserted into the first arm at a desired axial position along the first arm,
(iii) a first connecting arrangement for connecting the first arm to the crane or the structure at a location on the first arm that is opposite the female end portion;
(iv) a second connecting arrangement for connecting the second arm to the crane or the structure at a location opposite the male end portion; and
(v) a stop element disposed on the female end portion or the male end portion for preventing over-elongation of the first arm with respect to the second arm.
2. The crane tie arm assembly of 1. above, wherein the stop element is a protuberance formed at the terminal end of the female end portion or the terminal end of the male end portion, which protuberance is wider than adjacent protuberances on the female end portion or male end portion, respectively.
3. The crane tie assembly of 1. above, wherein the protuberances on the male end portion and female end portion are interrupted splines that engage with the corresponding channels formed between corresponding interrupted splines in the female end portion.
4. The crane tie assembly of 1. above, wherein the first and second connecting arrangements of the first and second arm, respectively, are configured for insertion of a pin when the female and male end portions are locked in place.
5. The crane tie assembly of 1. above, wherein the protuberances of the male end portion and the complementary channels of the female end portion are each arranged in at least three sets of columns.
6. The crane tie assembly of 5. above, wherein the first arm and second arm are locked in place by rotating the male end portion with respect to the female end portion by 55 to 65 degrees.
7. The crane tie assembly of 1. above, wherein the connecting arrangement for connecting the first arm to the crane or the structure comprises a coupling member that has one end for connection to the crane body and a second end for connection thereof to the first arm.
8. The crane tie assembly of 7. above, wherein the coupling member comprises a flange at its second end and is connected to the first arm by a corresponding flange formed on an end of the first arm opposite the female portion and wherein the flanges are connectable to one another by fasteners.
9. A method for connecting a body of a crane to a structure by a crane tie assembly, said method comprising:
(i) attaching a first arm of the crane tie assembly to a second arm of the crane tie assembly, said first arm comprising:
a cylindrical female end portion having a plurality of internal, elongate protuberances separated by channels defined therebetween, which protuberances are aligned parallel to one another and arranged in axially extending columns and wherein regions defined between said axially extending columns are smooth;
said second arm comprising:
a cylindrical male end portion having a plurality of spaced external, elongate protuberances, which protuberances are arranged in axially extending columns on the external surface thereof for mating engagement with the channels of said female end portion, and wherein regions defined between said columns of the male end portion are smooth,
(ii) locking the first arm and the second arm in place by aligning the protuberances of the male end portion with corresponding smooth regions of the female end portion, sliding the male end portion axially into the female end portion to a predetermined axial position and rotating the male or female end portion sufficiently to engage surfaces of the protuberances with complementary surfaces of the channels, wherein the first or second arm comprises a region that is axial to the axially extending columns, which region is free of protuberances and channels so that the second arm can be inserted into the first arm at the predetermined axial position along the first arm;

(iii) connecting the first arm to the crane or the structure via a first connecting arrangement; and (iv) connecting the second arm to the crane or the structure via a second connecting arrangement.

10. The method of 9. above, wherein, in the step of locking, a stop element disposed on the female end portion or the male end portion prevents over-elongation of the first arm axially with respect to the second arm.

11. The method of 10. above, wherein the stop element is a protuberance formed at the terminal end of the female end portion or the terminal end of the male end portion, which protuberance is wider than adjacent protuberances on the female end portion or male end portion, respectively.

12. The method of 9. above, wherein the protuberances on the male end portion and female end portion are interrupted splines that engage with the corresponding channels formed between corresponding interrupted splines in the female end portion.

13. The method of 9. above, wherein the connecting arrangements of the first and second arm are configured for insertion of a pin when the female and male end portions are locked in place.

14. The method of 9. above, wherein the protuberances of the male end portion and the complementary channels of the female end portion are each arranged in at least three sets of columns.

15. The method of 9. above, wherein the first arm and second arm are locked in place by rotating the male end portion with respect to the female end portion by 55 to 65 degrees.

16. The method of 9. above, wherein the first arm is connected to the crane or the structure via a separate coupling member that has one end for connection to the crane body and a second end for connection thereof to the first arm.

17. The method of 16. above, wherein the coupling member comprises a flange at its second end and wherein the first arm is connected to the structure or the crane by a corresponding flange formed on an end of the first arm opposite the female portion and wherein the flanges are connectable to one another by fasteners.

18. A tie arm assembly for connecting two structures, said assembly comprising:

(i) a first arm comprising:

a cylindrical female end portion having a plurality of internal, elongate protuberances separated by channels defined therebetween, which protuberances are aligned parallel to one another and arranged in axially extending columns and wherein regions defined between said axially extending columns are smooth;

(ii) a second arm comprising:

a cylindrical male end portion having a plurality of spaced external, elongate protuberances, which protuberances are arranged in axially extending columns on the external surface thereof for mating engagement with the channels of said female end portion, and wherein regions defined between said columns of the male end portion are smooth, wherein, the axially extending columns on the first and second arms are dimensioned such that the assembly can be coupled by aligning the protuberances of the male end portion with corresponding smooth regions of the female end portion, sliding the male end portion axially into the female end portion and rotating the male or female end portion sufficiently to engage surfaces of the protuberances with complementary surfaces of the channels, thereby engaging the first and second arms in a locked position;

and wherein the first or second arm comprises a region that is axial to the axially extending columns, which region is free of protuberances and channels so that the second arm can be inserted into the first arm at a desired axial position along the first arm, (iii) a first connecting arrangement for connecting the first arm to one of the two structures at a location on the first arm that is opposite the female end portion;

(iv) a second connecting arrangement for connecting the second arm to one of the two structures at a location opposite the male end portion;

(v) a stop element disposed on the female end portion or the male end portion for preventing over-elongation of the first arm with respect to the second arm, wherein the stop element is a protuberance formed at the terminal end of the female end portion or the terminal end of the male end portion, which protuberance is wider than adjacent protuberances on the female end portion or male end portion, respectively; and (vi) the first and second connecting arrangements comprising one or more members configured to receive a pin, thereby securing the first arm to one of the two structures and the second arm to another one of the two structures after the male and female end portions are locked in place.

19. The crane tie assembly of 18. above, wherein the protuberances of the male end portion and the complementary channels of the female end portion are each arranged in at least three sets of columns.

20. The crane tie assembly of 19. above, wherein the first arm and second arm are locked in place by rotating the male end portion with respect to the female end portion by 55 to 65 degrees.

BRIEF DESCRIPTION OF THE DRAWINGS

FIG. 3A shows one embodiment of the locked tie arm assembly in the fully extended position;

FIG. 3B shows one embodiment of the locked tie arm assembly in the fully retracted position;

FIG. 4A shows another embodiment of the locked tie arm assembly in the fully extended position; and FIG. 4B shows another embodiment of the locked tie arm assembly in the fully retracted position.

DETAILED DESCRIPTION

Figure 1A:
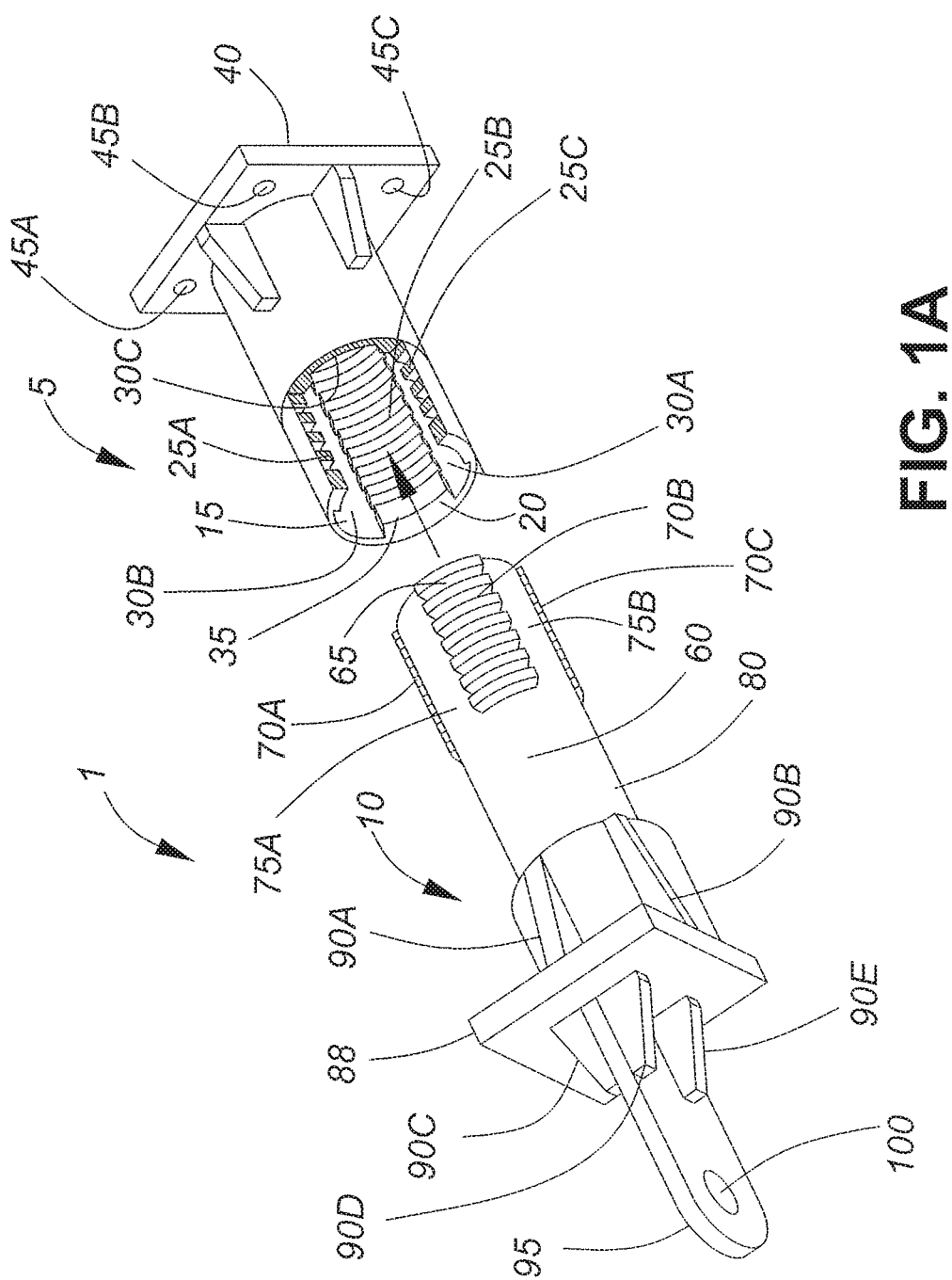
FIG. 1A shows a three-dimensional representation of the tie arm assembly of the present invention before the two arms are engaged together.

A three-dimensional representation of the tie arm assembly 1 is shown in FIG. 1A. The tie arm assembly 1 comprises a first arm 5 and a second arm 10. The first arm 5 comprises a cylindrical female end portion 15 having a plurality of internal, elongate protuberances 20. The plurality of internal, elongate protuberances 20 are separated by channels defined therebetween. As can be seen from FIG. 1A, the protuberances 20 are aligned parallel to one another and arranged in three axially extending columns shown as 25A, 25B and 25C in FIG. 1A. There are regions defined between the axially extending columns 25A, 25B and 25C that are smooth. Two of such smooth regions are shown in FIG. 1A as 30A and 30B. As will be appreciated, there are three smooth regions 30A, 30B and 30C disposed between axially extending columns 25A, 25B and 25C, but one of the regions, namely 30C, is obscured by the cut-out region of the drawing.

The cylindrical female end portion 15 also comprises a stop element, which is depicted in the drawing as a widened protuberance 35 at a terminal end of the female end portion 15. The widened protuberance 35 formed at the terminal end of the female end portion 15 is wider than the remaining protuberances 20 arranged in the axially extending columns 25A, 25B and 25C on the female end portion 15. The significance of the widened protuberance 35 will be described hereinafter with reference to FIG. 3B.

The opposite end of the first arm 5 terminates in a flange 40 in which four bores are formed. FIG. 1A shows three of such bores, namely 45A, 45B and 45C. The flange 40 is coupled to a similar flange 50 of a coupling element 55 shown in FIG. 2 and described in more detail below.

The second arm 10 of the tie arm assembly 1 comprises a cylindrical male end portion 60 having a plurality of spaced external, elongate protuberances 65. The protuberances 65 are arranged in axially extending columns 70A, 70B and 70C on the external surface thereof for mating engagement with corresponding channels of axially extending columns 25A, 25B and 25C of the female end portion 15. Similar to the female end portion 15, the regions defined between the columns of the male end portion 10 are smooth. Two of such regions are shown in FIG. 1A as 75A and 75B. The male end portion 60 also comprises a region 80 that is axial to the axially extending columns 70A, 70B and 70C that is free of protuberances and channels.

The opposite end of the second arm 10 comprises a flanged region 88 supported by ribs. FIG. 1A shows ribs 90A, 90B, 90C, 90D and 90E. A tongue 95 is attached to the flanged region 88 opposite the male end portion 60. A bore 100 is formed in the tongue 95 through which a pin 105 is received as shown in FIG. 2.

Figure 1B:
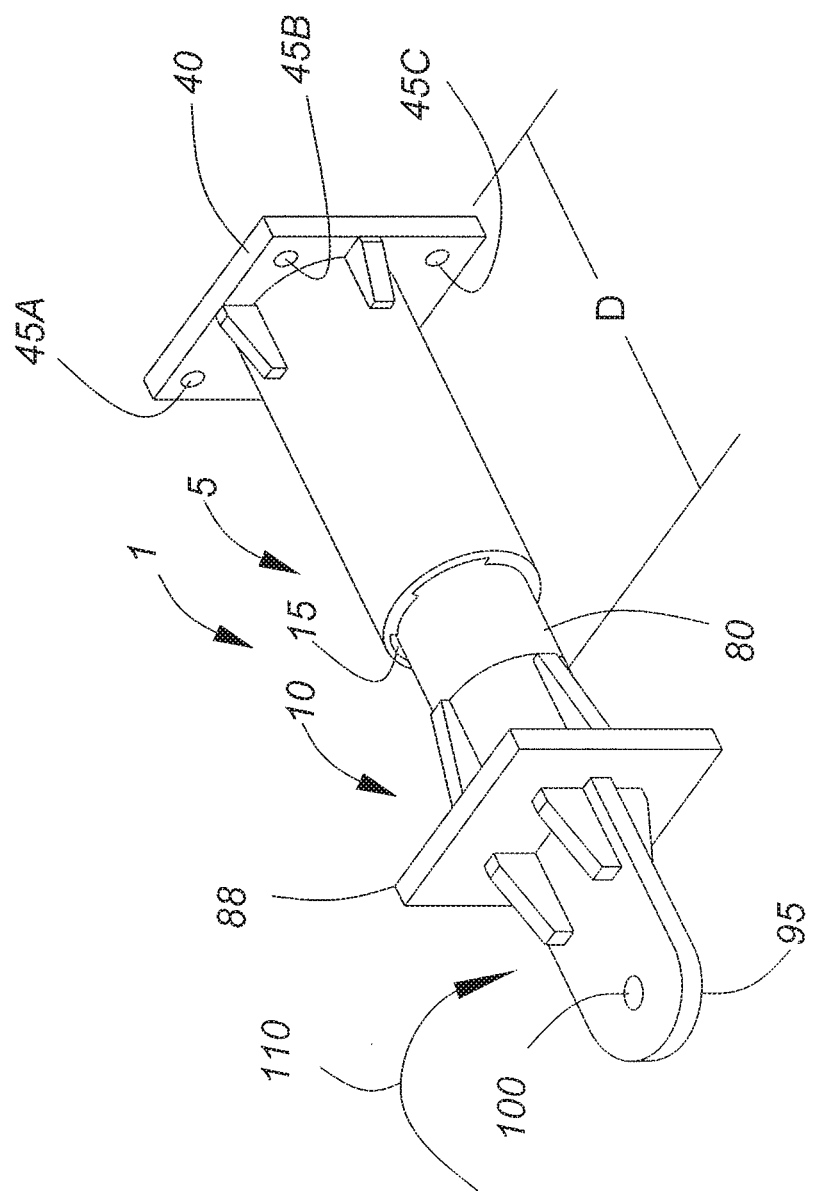
FIG. 1B shows a three-dimensional representation of the tie arm assembly after the two arms are engaged together.

FIG. 1B depicts the first arm 5 and the second arm 10 in a locked position. In order to lock the first arm 5 and the second arm 10, the protuberances 65 of the axially extending columns 70A, 70B and 70C of the male end portion are aligned with corresponding smooth regions 30A, 30B and 30C of the female end portion 15. The second arm 10 is then slid axially into the first arm 5. When a desired length of the tie arm assembly 1 is attained, shown by D in FIG. 1B, the second arm 10 is rotated 60 degrees with respect to the first arm 5. The rotation direction is shown by the arrow 110 shown in FIG. 1B. Rotating the second arm 10 by 60 degrees causes the male end portion 60 to rotate around a portion of the circumference of the female end portion 15 sufficiently to engage surfaces of the protuberances 65 on the male end portion 60 with complementary surfaces of the channels of the female end portion 15. Interlocking of columns 25A, 25B and 25C of the female end portion 15 with complementary columns 70A, 70B and 70C of the male end portion 60 causes the first and second arms 5, 10 to be secured in a locked position. In order to achieve such a mating engagement, the shapes of the protuberances of the male end portion 60 and the female end portion 15 are complementary. In the locked position shown in FIG. 1B, the tongue 95 is also rotated by 60 degrees. As a result, the tongue lies in a plane that is 90 degrees to vertical when the tie arm assembly is mounted between a crane and the structure. This facilitates connection of the second arm to a structure, as depicted in FIG. 2 and described in more detail below.

Figure 2:
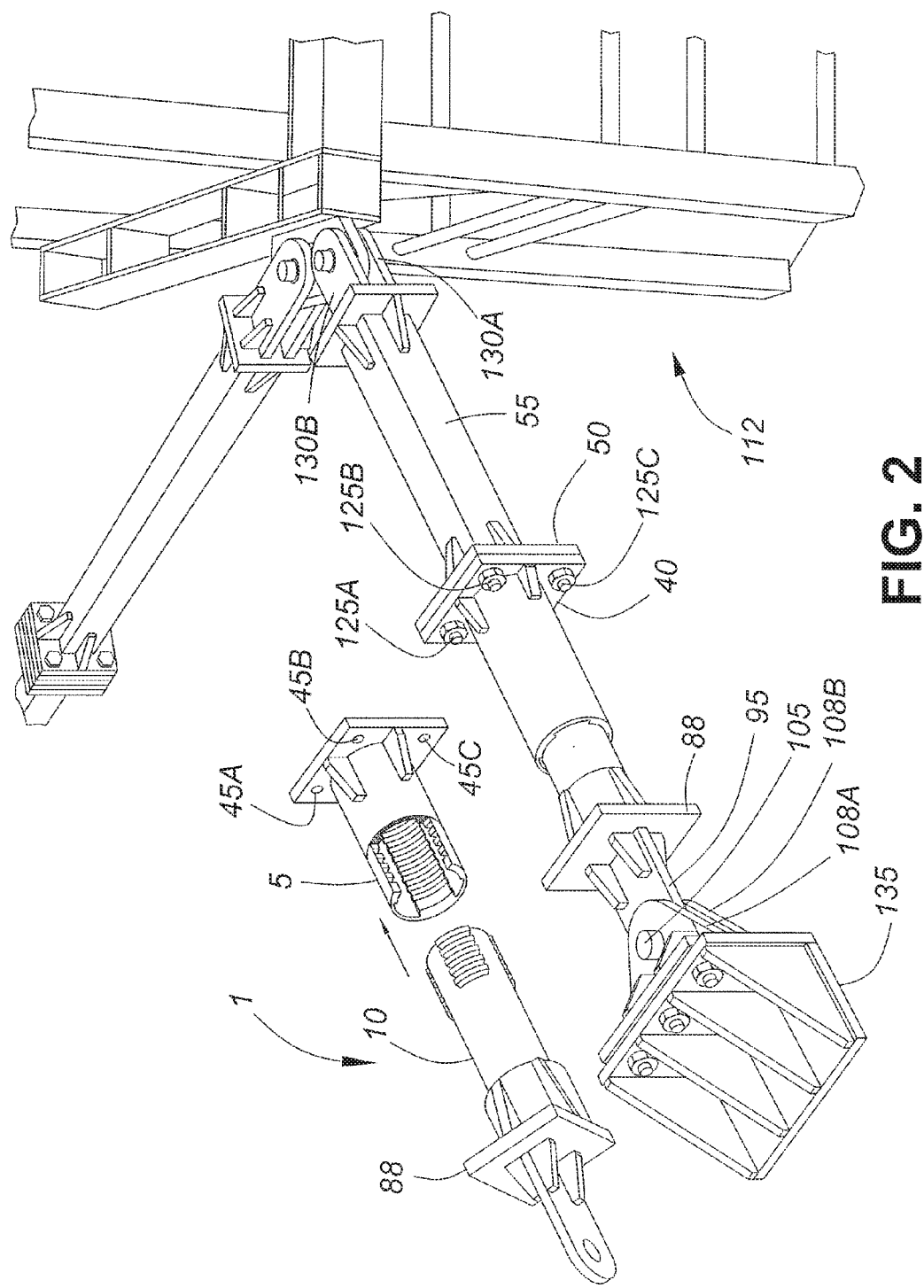
FIG. 2 shows the tie arm assembly as it may be used.

FIG. 2 shows the tie arm assembly 1 attached to a crane 112 (via an anchor described below) as well as a tie arm assembly 1 in an unlocked position. The unlocked and locked tie arm assemblies are the same as the tie arm assembly 1 shown in FIG. 1A, but with some of the reference numbers omitted for simplicity.

As depicted in FIG. 2, after the first arm 5 and the second arm 10 are engaged in a locked position at the predetermined length D (see FIG. 1B), the tie arm assembly is attached at one end to the crane 112 and the other end to a structure via an anchor via first and second connecting assemblies. Such a structure includes a building on which the crane 112 is working, or any other structure on which it is desired to fix the crane 112.

As mentioned previously, the locked tie arm assembly 1 is connected at one end to the crane 112 via the coupling element 55. The flange 50 of coupling element 55 is attached to flange 40 of the first arm by bolts, which includes bolts 125A, 125B and 125C through respective bore holes 45A, 45B and 45C shown in FIG. 1A (note one of the bolts is not visible in the drawing). The opposite end of the coupling element 55 comprises two parallel tongues 130A and 130B, each defining respective bores. The crane 112 comprises a tongue, likewise with a bore. When the bores 130A and 130B are aligned with the bore in the tongue disposed on the crane 112, a pin is inserted through the aligned bores, thereby securing the first arm 5 to a mast of the crane 112.

As further depicted in FIG. 2, the tie arm assembly 1 is connected at its other end to the structure via an anchor block 135. The anchor block 135 comprises a pair of tongues 108A and 108B, each with bores. When tongue 95 of the second arm 10 is slid between the pair of tongues 108A and 108B on the anchor block 135, and when the respective bores on each tongue are aligned, the pin 105 can be inserted through the aligned bores, thereby attaching the second arm 10 to the structure via the anchor block 135.

The above-described tie arm assembly 1 can thus be used to attach a crane to a structure without requiring custom fabrication to provide a predetermined spacing D. As noted, the spacing between the crane body and the structure to which the crane is attached can vary depending on the structure to which the crane is attached. The crane tie arm assembly described in the embodiment above is also simple in construction and easy to install.

The ease of adjustment of length D between two lengths, represented by D1 and D2, is illustrated in more detail in FIG. 3A and FIG. 3B, both of which are cross-sectional side views of the tie arm assembly in a locked position. As will be appreciated, the length of the arms of the tie arm assembly 1 can vary between D1 and D2 depending on the distance that the male end portion 60 is inserted into the female end portion 15.

FIG. 3A shows the locked tie arm assembly 1 in which the length of the arms of the tie arm assembly is D1, which is the fully extended position. In this embodiment, the terminal end of the male end portion 60 of the second arm 10 has a stop element, which in this embodiment is a protuberance 140 that is wider in relation to the other protuberances 65 on the male end portion 60. This stop element functions to prevent over-elongation of the tie arm assembly 1 since the male end portion 60 cannot be displaced axially outward relative to the female end portion 15 any further in the direction shown by the arrow. This is because, if the male end portion 60 were to be moved any further axially outward in the direction of the arrow, the respective protuberances on the male and female end portions would not be able to mesh. This effectively prevents a user from attaching the first and second arms in an over extended position that is greater than D1. Preventing over extension is advantageous since such an over-extended position does not provide adequate compressive or tensile capacity and thus can pose a safety concern. In order to enable the adjustable feature, it will also be appreciated from FIG. 3A that a region of the female end portion is free of protuberances and channels. Such region is depicted by 145 in FIG. 3A.

FIG. 3B shows the tie arm assembly 1 in a second locked position having a length of D2, which is the fully retracted position. To achieve the second locked position D2, the male end portion 60 of the second arm 10 is inserted further into the female end portion 15, beyond the smooth region 145. Similar to FIG. 3A, the protuberances 65 of the male end portion 60 matingly engage the corresponding channels of the female end portion 15 in the overlap region depicted by 150. In the smooth region 145 of the female end portion 5, there is no mating engagement of the protuberances 65 of the male end portion 60 and thus the wider protuberance 140 can slide along the female end portion unimpeded.

FIGS. 4A and 4B depict an embodiment in which the stop element is in the female end portion 15 and is a widened protuberance 155 at its terminal end (rather than the male end portion 60, as depicted above in FIG. 3A and FIG. 3B). In addition, the male end portion 60 has the smooth region 80 described previously, while the female end portion 15 has protuberances along its entire axial length. This embodiment is the same as that described in FIG. 1A.

FIG. 4A shows the tie assembly in a locked position in which the length of the two arms of the tie arm assembly is D1. The male end portion 60 cannot extend further outwardly in the axial direction shown by the arrow because of the widened protuberance 155 in the female end portion. That is, if the male end portion 60 is moved axially to reduce the length of the overlap 150, one of the protuberances 65 of the male end portion 60 cannot mesh with the widened protuberance 155. This effectively prevents a user from attaching the first and second arms in an over extended position (i.e., greater than D1).

FIG. 4B shows the tie assembly in a locked position in which the length of the two arms of the tie arm assembly is D2, which is the fully retracted locked position. To achieve the retracted locked position, the male end portion 60 of the second arm 10 is inserted further into the female end portion 15, beyond the smooth region 80. Similar to FIG. 4A, the protuberances 65 of the male end portion 60 matingly engage the channels of the female end portion 15 in the region depicted by 150. In the smooth region 80 of the male end portion 60, there is no mating engagement of the protuberances 65 of the male end portion and thus the widened protuberance 155 can slide freely through the female end portion unimpeded.

The above-described tie arm assembly can provide for simplified installation and disassembly. As noted, the first and second tie arms are locked in place at a desired length, and overextension is not possible due to the widened protuberance formed on either the male or female end portion. The minimum overlap region 150 can be calculated based on the anticipated axial load.

As depicted in FIG. 2, multiple tie arm assemblies may be used to attach the crane to the structure. The tie arm assemblies may be located at spaced intervals along the vertical length of the crane body and/or a number of tie arm assemblies can be located at a given vertical location on the crane body.

The tie arm assembly can be manufactured of steel, brass or aluminum depending on the application. The degree of play between the protuberances may be limited to prevent wear and tear. The connecting assemblies need not be limited to tongues comprising bores through which a pin is inserted as described. Other configurations can be utilized as would be apparent to a person of ordinary skill in the art. Preferably, the connection is quick release for ease of connection by a user.

The above describes three columns of protuberances on the male and female end portion, but fewer or more columns can be utilized if desired. However, a configuration with three columns of protuberances as described can potentially offer greater stability than two columns. The protuberances are generally aligned perpendicular to the longitudinal axis of the first and second arms and are most typically splines, although other kinds of protuberances can be employed depending on the application.

It should be appreciated that the tie arm assembly may be used in other applications besides stabilizing a crane. The tie arm assembly may be used to support two structures and includes its use as a truss component, a shoring post or in scaffolding. The connecting assemblies at each end of the tie arm assembly are configured based on the specific application. As described above, regions defined between the axially extending columns are smooth. However, it should be understood that the regions need not be completely frictionless as the purpose is for the protuberances of a male or female end portion to slide over the smooth regions before locking. That is, the smooth regions have at least a substantially even and regular surface, which is free from perceptible projections, lumps, or indentations that would prevent substantially free movement of the projections of a corresponding male or female end portion over the surface.

The embodiments described above should not be construed to limit the scope of the invention. The skilled artisan readily recognizes that many other embodiments are encompassed by the invention.

The invention claimed is:

1. A crane tie arm assembly for connecting a crane to a structure, said assembly comprising:
   (i) a first arm comprising:
      a cylindrical female end portion having a plurality of internal, elongate protuberances separated by channels defined therebetween, which protuberances are aligned parallel to one another and arranged in axially extending columns and wherein regions defined between said axially extending columns are smooth;
   (ii) a second arm comprising:
      a cylindrical male end portion having a plurality of spaced external, elongate protuberances, which protuberances are arranged in axially extending columns on the external surface thereof for mating engagement with the channels of said female end portion, and wherein regions defined between said columns of the male end portion are smooth,
      wherein, the axially extending columns on the first and second arms are dimensioned such that the assembly can be coupled by aligning the protuberances of the male end portion with corresponding smooth regions of the female end portion, sliding the male end portion axially into the female end portion and rotating the male or female end portion sufficiently to engage surfaces of the protuberances with complementary surfaces of the channels, thereby engaging the first and second arms in a locked position;
and wherein the first or second arm comprises a region that is axial to the axially extending columns, which region is free of protuberances and channels so that the second arm can be inserted into the first arm at a desired axial position along the first arm, (iii) a first connecting arrangement for connecting the first arm to the crane or the structure at a location on the first arm that is opposite the female end portion;

(iv) a second connecting arrangement for connecting the second arm to the crane or the structure at a location opposite the male end portion; and (v) a stop element disposed on the female end portion or the male end portion for preventing over-elongation of the first arm with respect to the second arm.

2. The crane tie arm assembly of claim 1, wherein the stop element is a protuberance formed at the terminal end of the female end portion or the terminal end of the male end portion, which protuberance is wider than adjacent protuberances on the female end portion or male end portion, respectively.

3. The crane tie assembly of claim 1, wherein the protuberances on the male end portion and female end portion are interrupted splines that engage with the corresponding channels formed between corresponding interrupted splines in the female end portion.

4. The crane tie assembly of claim 1, wherein the first and second connecting arrangements of the first and second arm, respectively, are configured for insertion of a pin when the female and male end portions are locked in place.

5. The crane tie assembly of claim 1, wherein the protuberances of the male end portion and the complementary channels of the female end portion are each arranged in at least three sets of columns.

6. The crane tie assembly of claim 5, wherein the first arm and second arm are locked in place by rotating the male end portion with respect to the female end portion by 55 to 65 degrees.

7. The crane tie assembly of claim 1, wherein the connecting arrangement for connecting the first arm to the crane or the structure comprises a coupling member that has one end for connection to the crane body and a second end for connection thereof to the first arm.

8. The crane tie assembly of claim 7, wherein the coupling member comprises a flange at its second end and is connected to the first arm by a corresponding flange formed on an end of the first arm opposite the female portion and wherein the flanges are connectable to one another by fasteners.

9. A method for connecting a body of a crane to a structure by a crane tie assembly, said method comprising:
(i) attaching a first arm of the crane tie assembly to a second arm of the crane tie assembly,
said first arm comprising:
a cylindrical female end portion having a plurality of internal, elongate protuberances separated by channels defined therebetween, which protuberances are aligned parallel to one another and arranged in axially extending columns and wherein regions defined between said axially extending columns are smooth;
said second arm comprising:
a cylindrical male end portion having a plurality of spaced external, elongate protuberances, which protuberances are arranged in axially extending columns on the external surface thereof for mating engagement with the channels of said female end portion, and wherein regions defined between said columns of the male end portion are smooth, (ii) locking the first arm and the second arm in place by aligning the protuberances of the male end portion with corresponding smooth regions of the female end portion, sliding the male end portion axially into the female end portion to a predetermined axial position and rotating the male or female end portion sufficiently to engage surfaces of the protuberances with complementary surfaces of the channels,
wherein the first or second arm comprises a region that is axial to the axially extending columns, which region is free of protuberances and channels so that the second arm can be inserted into the first arm at the predetermined axial position along the first arm;

(iii) connecting the first arm to the crane or the structure via a first connecting arrangement; and (iv) connecting the second arm to the crane or the structure via a second connecting arrangement.

10. The method of claim 9, wherein, in the step of locking, a stop element disposed on the female end portion or the male end portion prevents over-elongation of the first arm axially with respect to the second arm.

11. The method of claim 10, wherein the stop element is a protuberance formed at the terminal end of the female end portion or the terminal end of the male end portion, which protuberance is wider than adjacent protuberances on the female end portion or male end portion, respectively.

12. The method of claim 9, wherein the protuberances on the male end portion and female end portion are interrupted splines that engage with the corresponding channels formed between corresponding interrupted splines in the female end portion.

13. The method of claim 9, wherein the connecting arrangements of the first and second arm are configured for insertion of a pin when the female and male end portions are locked in place.

14. The method of claim 9, wherein the protuberances of the male end portion and the complementary channels of the female end portion are each arranged in at least three sets of columns.

15. The method of claim 9, wherein the first arm and second arm are locked in place by rotating the male end portion with respect to the female end portion by 55 to 65 degrees.

16. The method of claim 9, wherein the first arm is connected to the crane or the structure via a separate coupling member that has one end for connection to the crane body and a second end for connection thereof to the first arm.

17. The method of claim 16, wherein the coupling member comprises a flange at its second end and wherein the first arm is connected to the structure or the crane by a corresponding flange formed on an end of the first arm opposite the female portion and wherein the flanges are connectable to one another by fasteners.

18. A tie arm assembly for connecting two structures, said assembly comprising:
(i) a first arm comprising:
a cylindrical female end portion having a plurality of internal, elongate protuberances separated by channels defined therebetween, which protuberances are aligned parallel to one another and arranged in axially extending columns and wherein regions defined between said axially extending columns are smooth;

(ii) a second arm comprising:
   a cylindrical male end portion having a plurality of spaced external, elongate protuberances, which protuberances are arranged in axially extending columns on the external surface thereof for mating engagement with the channels of said female end portion, and wherein regions defined between said columns of the male end portion are smooth,
   wherein, the axially extending columns on the first and second arms are dimensioned such that the assembly can be coupled by aligning the protuberances of the male end portion with corresponding smooth regions of the female end portion, sliding the male end portion axially into the female end portion and rotating the male or female end portion sufficiently to engage surfaces of the protuberances with complementary surfaces of the channels, thereby engaging the first and second arms in a locked position;
   and wherein the first or second arm comprises a region that is axial to the axially extending columns, which region is free of protuberances and channels so that the second arm can be inserted into the first arm at a desired axial position along the first arm,
(iii) a first connecting arrangement for connecting the first arm to one of the two structures at a location on the first arm that is opposite the female end portion;
(iv) a second connecting arrangement for connecting the second arm to one of the two structures at a location opposite the male end portion;
(v) a stop element disposed on the female end portion or the male end portion for preventing over-elongation of the first arm with respect to the second arm, wherein the stop element is a protuberance formed at the terminal end of the female end portion or the terminal end of the male end portion, which protuberance is wider than adjacent protuberances on the female end portion or male end portion, respectively; and
(vi) the first and second connecting arrangements comprising one or more members configured to receive a pin, thereby securing the first arm to one of the two structures and the second arm to another one of the two structures after the male and female end portions are locked in place.

19. The crane tie assembly of claim 18, wherein the protuberances of the male end portion and the complementary channels of the female end portion are each arranged in at least three sets of columns.

20. The crane tie assembly of claim 19, wherein the first arm and second arm are locked in place by rotating the male end portion with respect to the female end portion by 55 to 65 degrees.

* * * * *